United States Patent [19]

Dietl

[11] Patent Number: 5,112,376
[45] Date of Patent: May 12, 1992

[54] PROCESS AND APPARATUS FOR THE OUTER CALIBRATION OF SECTIONS OF GLASS TUBE

[75] Inventor: Steffen Dietl, Hackenheim, Fed. Rep. of Germany

[73] Assignee: Schott Glaswerke, Mainz, Fed. Rep. of Germany

[21] Appl. No.: 780,839

[22] Filed: Oct. 23, 1991

Related U.S. Application Data

[63] Continuation of Ser. No. 629,816, Dec. 21, 1990, abandoned.

[30] Foreign Application Priority Data

Dec. 22, 1989 [DE] Fed. Rep. of Germany ....... 3942566

[51] Int. Cl.⁵ ................................. C03B 9/30
[52] U.S. Cl. .......................... 65/29; 65/86; 65/158; 65/374.13; 65/DIG. 9; 33/502
[58] Field of Search .............. 65/29, 86, 158, 374.13, 65/DIG. 9; 33/502, 522, 555.1, 555.2, DIG. 19

[56] References Cited

U.S. PATENT DOCUMENTS

| | | | |
|---|---|---|---|
| 1,848,940 | 3/1932 | Delpech | 65/29 X |
| 2,150,017 | 3/1939 | Barnard | 65/158 X |
| 4,391,622 | 7/1983 | Alting et al. | 65/374.13 X |

FOREIGN PATENT DOCUMENTS

| | | | |
|---|---|---|---|
| 1284581 | 12/1968 | Fed. Rep. of Germany . | |
| 258626 | 4/1970 | U.S.S.R. | 65/158 |
| 823320 | 4/1981 | U.S.S.R. | 65/29 |

OTHER PUBLICATIONS

Glas-Email-Keramo-Technik, 1953, pp. 172-175 May 1953 "Kalibreren von Glasrohren".

Primary Examiner—Robert L. Lindsay
Attorney, Agent, or Firm—Millen, White & Zelano

[57] ABSTRACT

A softened section of length of a glass tube is expanded in a dimensionally accurate mold until it has assumed the dimensions of the mold, the mold being made of a material of lower thermal expansion than that of the glass, so that, after cooling, the calibrated section of tube can be released from the mold without any problems. A block of a α-o glass ceramic with a calibrated mold bore is preferably employed as the mold. It is possible for the first time to avoid a material-removing machining step, which causes damage to the glass surface, yet to be able to produce sections of the tube with a calibrated outside diameter of a dimensional accuracy which could previously be attained only by cylindrical grinding.

24 Claims, 1 Drawing Sheet

PROCESS AND APPARATUS FOR THE OUTER CALIBRATION OF SECTIONS OF GLASS TUBE

This application is a continuation of application Ser. No. 07/629,816, filed Dec. 21, 1990 abandoned.

BACKGROUND OF THE INVENTION

This invention relates to a process and apparatus for calibrating glass tubes.

Glass tubes can be produced by a continuous tube-drawing process in the case of nominal widths up to about 400 mm, by a discontinuous blowing process in the case of larger nominal widths up to about 600 mm, and by centrifugal forces between 600 and 1000 mm. The sections of glass tube produced by blowing or centrifuging are subsequently joined together by fusing to form glass tubes of the desired length.

The glass tubes produced by the abovementioned processes have considerable tolerances in outside diameter, which may be up to about $\pm 1$ mm in the case of small diameters ($\leqq 50$ mm) and of the order of up to $\pm 5-6$ mm in the case of larger diameters ($\approx 600$ mm). The glass tubes produced by the centrifugal process have, in any case, a conical shape inherent in the method of production.

For many industrial applications, in particular for fabricating plants utilizing glass apparatus, it is necessary to provide glass tubes or sections of glass tube of precisely defined outside diameter. It is consequently an increasingly frequent occurrence in glass apparatus construction, in particular for composites having a wide variety of corrosion-resistant materials, such as for example PTFE or other fluoroplastics, high-alloy special steels, Hastelloy, titanium, tantalum, graphite, inter alia, that such composites have to be made, for example in the form of internal fittings for glass apparatuses. As a rule, these fittings must be sealed, and this requirement, on account of the poor tolerances attainable, heretofore has continued to be accompanied by problems.

Examples of such glass apparatuses which may be mentioned in particular are shell and tube heat exchangers and falling film evaporators. These essentially comprise a multiplicity of evaporator tubes which are arranged parallel to one another within a shell, and are open at their respective ends in the bores of end plates of metal, where they are individually sealed off from the outer space by means of O-rings. While the bores and also the O-rings have predetermined exact dimensions, the evaporator tubes may exhibit tolerances of about $\pm 1$ mm (with the outside diameters $\approx 40$ mm). The sealing problems occurring in the assembly of these glass apparatus are therefore considerable.

In the prior art, various processes for the production of glass tubes with small dimensional deviations in the outside diameter have been proposed. Some of these proposals concern shaping measures which are taken while the drawing process is still going on. Others concern reshaping processes which are carried out on the finish-drawn, blown or centrifuged glass tube or section of glass tube.

German Patent Specification 2,229,164 and German Patent Specification 2,430,428 describe processes for the production of glass tubes having close outside-diameter tolerances during drawing, the still plastic tube leaving the drawing zone being brought to the desired outside diameter by means of suitable shaping tools, such as for example rollers or plates. These processes have the disadvantage that the shaping tools bearing against the outer circumference of the glass tube leave undesired pressure points on the outer wall of the glass tube on leaving the shaping zone, to the detriment of the outside-diameter tolerance. If an inadequate number of shaping tools arranged radially around the tube are used, the glass tube, in the worst case, may even be given an out of round cross-section. In German Patent Specification 2,430,428, for example, tolerances in the outside diameter of 0.2-0.3 mm are indicated over a tube length of only 20 mm.

German Offenlegungsschrift 2,807,596 discloses a process for the outer calibration of sections of glass tube of large nominal widths, according to which a section of glass tube clamped at both ends is brought to softening temperature in a deforming zone and the softened glass in the deforming zone is pressed against an outer calibrating face by means of a shaped part moved inside the section of glass tube along the path of a helical line with respect to the said section. Even in with this process, adequately close tolerances cannot be accomplished, the publication itself describing dimensional deviations on the order of tenths of a millimeter. Aside from being restricted to large nominal widths, a further disadvantage of the process is that the length of the calibrated section of glass tube is also restricted due to the risk of sagging in the softened region.

Consequently, at present the only possibility which remains for the production of a glass tube or section of glass tube of virtually any nominal width with a precisely defined outside diameter requires cylindrical grinding and polishing. However, like every "material-removing" machining, this damages the glass surface, as a result of which the strength of the component is considerably impaired. In addition, cylindrical grinding is a very laborious process.

SUMMARY OF THE INVENTION

An object of the present invention is thus to provide a simple process and apparatus for the outer calibration of sections of glass tube which permits the production of sections of glass tube having a dimensional accuracy of the outside diameter comparable to that of cylindrically ground tubes, without, however, causing damage to the glass surface.

Upon further study of the specification and appended claims, further objects and advantages of this invention will become apparent to those skilled in the art.

To attain the process object of the invention there is provided a process for the outer calibration of sections of glass tube having a hollow interior and an outer wall, comprising softening said glass tube over a section of length to be calibrated, expanding resultant softened section of length in a mold having an inner wall comprising a cylindrical cavity of precise dimensions, said mold being open on at least one and, by generating a higher pressure in the interior of the tube outside the tube, until said outer wall of the tube comes completely into contact with the inner wall of the mold, the improvement which comprises employing a mold of a dimensionally and thermally stable glass ceramic of a lower thermal expansion than that of the glass being calibrated, and subsequently cooling the mold containing the resultant expanded section of length until the resultant cooled section of length can be released from the mold due to its greater shrinkage.

In other words, the process according to the invention concerns a recalibration process. A finished-drawn, blown or centrifuged glass tube is brought to softening temperature over a section of length to be calibrated. The softened section of length is subsequently expanded in a cylindrical cavity of exact dimensions in a mold by generating a pressure difference between the interior of the tube and its external surroundings, a higher pressure having to prevail on the inside than on the outside, until its outer wall comes completely into contact with the inner wall of the cavity. In so doing, the dimensional accuracy of the mold inner wall is transferred onto the tube outer wall. The pressure difference must be maintained after expansion at least until at least the outer skin of the tube wall of the softened section of tube has solidified again. According to the invention, the mold consists of a dimensionally and thermally stable material of lower thermal expansion than that of the glass, so that, after cooling of mold and glass, the expanded section of length can be released from the mold without any problems due to its greater shrinkage. It is obvious that the softened section of length must not protrude from the mold on both ends during calibration, as otherwise the tube can no longer be removed from the mold after expansion. Therefore, the length of the softened section of tube is expediently dimensioned such that the said section can be introduced completely into the calibrating zone of the mold.

The calibrated section of length may either remain on the glass tube or else be cracked off and, depending on the application, fused onto other parts. Thus, it is sufficient, for example, in the case of the abovementioned evaporator tubes, in each case to calibrate the end sections lying in the sealing region or to fuse calibrated sections of the tube onto these ends.

The expansion of the softened section of tube is expediently performed by means of a positive pressure applied inside the glass tube. For this purpose, as a rule, one end of the glass tube is sealed, for example melted closed, before calibration. The other end is then provided, for example, with a compressed air supply and fed with compressed air during calibration. However, other gases may also be employed for generating the positive pressure. If the section of length to be calibrated lies in the end region of the tube, it is also possible to dispense with the sealing if a mold which is closed on one side is used. The corresponding tube end is then pressed firmly onto the base of the mold and is sealed by the said base.

In principle, it is also possible to introduce the mold and the glass tube into a housing which can be closed off pressure-tight from the outside and to perform the expansion by applying a negative pressure in the space between the tube outer wall and the housing inner wall.

It is of advantage during expansion to keep the mold of the section of tube at a temperature so far below the softening temperature of the glass that the softened glass immediately forms a rigid outer skin upon first contact with the cooler mold inner wall. The cooling glass contracts and thereby immediately releases itself again from the inner wall of the mold, without any adhering of the glass to the mold occurring. It is consequently not necessary to dress or lubricate the mold. On the other hand, the temperature of the mold must also not be too low, as otherwise harmful tensile stresses, under certain circumstances resulting in fracture, can occur in the tube wall on account of the great temperature difference between solidified outer skin and still hot tube inner wall.

As a rule, the process according to the invention is used for industrial glass tubing. For example, glass apparatuses and pipelines are predominantly made of chemically resistant borosilicate glass, due to its excellent chemical and physical properties. Along with a high silica content of about 70-80%, these glasses contain significant proportions of boric acid (about 7-13%), as well as, in addition to alkali metal oxides ($Na_2O$, $K_2O$, 4-8%), also aluminum oxide (2-7%), and, if appropriate, alkaline earth metal oxides (BaO, CaO, 0-5%) and meet the international standard ISO/DIN 3585, "Borosilikatglas 3.3" (borosilicate glass 3.3). They are also distinguished in particular by a low thermal expansion—the lowest so far attainable with industrial glasses—of $3.3 \cdot 10^{-6} \cdot K^{-1}$.

The softening temperatures of the glasses suitable for glass apparatus construction are generally around 700° C. and higher. Therefore, with these glasses, the temperature of the mold should not exceed 500° C., in order to ensure immediate solidifying of the outer skin upon first contact with the mold. On the other hand, the temperatures should not drop below 300° C., in order to avoid the development of harmful tensile stresses in the glass tube wall.

All materials which have a lower thermal expansion than the specific glass tube to be calibrated and, in addition, are adequately dimensionally stable at the, as a rule, high temperatures occurring during the calibration process are suitable as mold materials.

Materials which meet these requirements are found in particular among glass ceramics. Their compositions and consequently also their properties may vary greatly. In the present invention, expediently only glass ceramics of which the thermal expansion is less than that of the particular glass tube to be calibrated are employed. Of particular advantage, are glass ceramics having a coefficient of thermal expansion in the temperature range of interest of 20°-500° C. less than that of the above mentioned borosilicate glass of $3.3 \cdot 10^{-6} \cdot K^{-1}$.

The greater the difference in the thermal expansion behavior of the glass tube and of the mold material, the more easily and quickly the calibrated tube can be removed from the mold. Therefore, glass ceramics of which the thermal expansion is virtually zero or even less than zero are preferred. Such glass ceramics are known per se and described for example in the publication "Schott technische Gläser" (Schott industrial glasses). The glass ceramics concerned are those from the system $Li_2O$—$Al_2O_3$—$SiO_2$ with small quantities of alkali metal oxides and alkaline earth metal oxides as well as $TiO_2 + ZrO_2$ as nucleating agents.

Molded articles made from these glass ceramics are distinguished by a high dimensional stability which is even retained after any desired temperature changes and temperature differences as long as a temperature of 700° C. is not exceeded for the ceramic. These positive properties are also accompanied by an extremely high long-term stability, which makes this material even more particularly suitable for use as mold material.

A preferred apparatus for carrying out the process according to the invention comprises a block of glass ceramic of the abovementioned type with a calibrated cylindrical cavity, going all the way through or closed on one side. The cavity may in this case be made in the glass ceramic block by various methods. A process analogous to the known KPG process for the inner calibration of glass tubes is advantageously employed. In this process, the still molten starting glass for the glass ceramic is poured into a mold having a steel mandrel of exact dimensions. After cooling, the steel mandrel is withdrawn from the glass ceramic block, in which it leaves behind a dimensionally accurate cylindrical cavity. Only after this step, does the transformation into the glass ceramic take place by a suitable temperature treatment. In some cases, the ceramizing may have to be followed by a regrinding or repolishing of the cavity inner wall.

A further possibility is to make a mold bore in a glass ceramic block. As a rule this takes place by means of a crown drill. By subsequent honing and polishing, the desired diameter can be set exactly to within a thousandth of a millimeter over large lengths, analogously to the KPG process.

Since, in particular with the KPG process, dimensionally accurate openings can be readily produced in a glass ceramic mold with diameters of about one tenth of a millimeter over a length of at least ¼ meter and more, there are virtually no limits for the process according to the invention to the dimensions of outer-calibrated sections of tube in the ranges of interest for most applications.

If a predetermined outside diameter is to be set as exactly as possible with the process according to the invention, both the thermal expansion of the glass and that of the glass ceramic must be taken into consideration when dimensioning the diameter of the cavity in the glass ceramic block.

It is to be further understood that the process according to the invention is by no means restricted to the production of dimensionally accurate cylindrical hollow glassware. Dimensionally accurate hollow glassware of conical shape can likewise be produced.

The advantages which can be attained with the invention are in particular that it is possible for the first time to avoid a step of material-removing machining, which causes a weakening of the component due to damage to the glass surface, yet to produce by a simple process sections of glass tube having a calibrated outside diameter of a dimensional accuracy which corresponds to that obtainable by material-removing machining. In particular, by using a mold material having long-term stability even under high temperatures, such as for example a glass ceramic, it is possible to reproduce dimensionally accurate sections of tube virtually as often as desired with a mold made only once. In particular, bearing in mind the fact that each new dimension requires a new mold, the process according to the invention is preferably used when calibrated sections of tube of repeatedly recurring dimensions are required, such as for example in the case of the evaporator tubes in falling film evaporators and shell and tube heat exchangers, as previously discussed.

In principle, it is also possible to produce longer calibrated pieces of tube by zonal expansion.

The invention is explained in further detail below with reference to the Figure.

BRIEF DESCRIPTION OF DRAWING

The attached figure depicts a preferred apparatus for carrying out the process according to the invention, shown in a vertical sectional view.

DETAILED DESCRIPTION OF DRAWING

Figure 1:
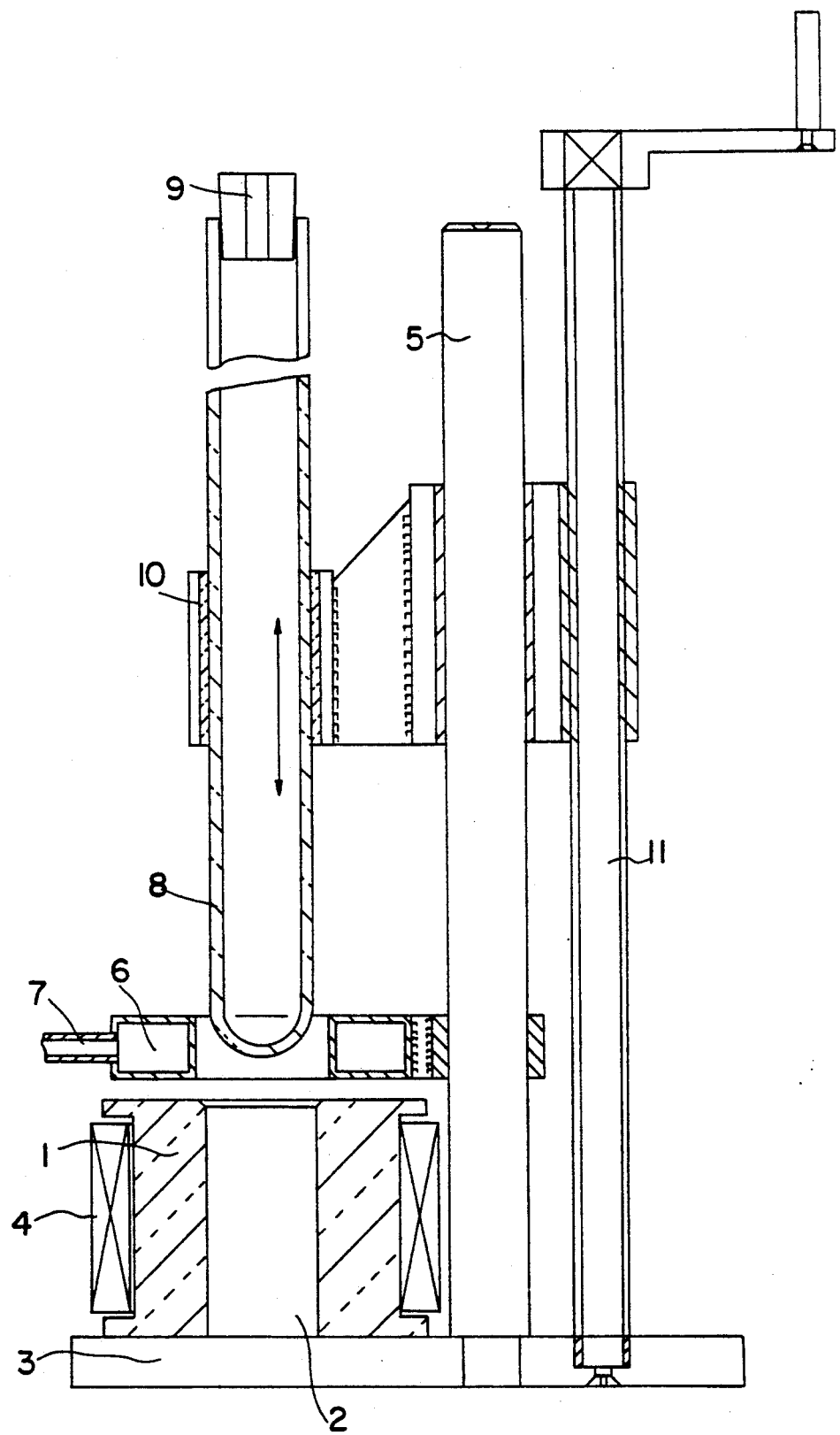

A glass ceramic block (1) with an exact mold bore (2) is supported by a base plate (3). The glass ceramic block (1) can be heated by means of electric resistance heating (4) on the circumference of the block. Means for cooling the mold may also be provided. This is of interest not only for a faster process sequence, but also in particular also whenever, in a mass production of calibrated sections of tube or in zonal expansion of longer glass tubes, the mold would be heated gradually by the sections of tube brought to softening temperature. A ring burner (6), which is supplied with fuel via a gas supply (7), is fastened to a longitudinal guide (5) directly above the opening of the bore (2). The glass tube to be calibrated is denoted by (8). This is melted closed at its lower end and provided with a compressed air supply (9) at its upper end. The glass tube is held by a tube holder (10), displaceable in the vertical direction along the longitudinal guide (5). The upward and downward movement can thereby be carried out manually by means of a threaded spindle (11).

For calibration, the glass tube (8) is thus moved downwards by means of the threaded spindle (11), it slowly passing the ring burner (6), beginning with its lower end, softening as it does so over a predetermined length, which is expediently less than that of the calibration zone in the mold, and finally being introduced into the mold bore (2). Subsequently, the glass tube is fed with compressed air via the compressed air supply (9). This causes the softened tube end to expand until its outer wall comes completely into contact with the bore inner wall. The temperature of the glass ceramic block (1) is at the same time maintained by means of the electric resistance heating (4), which temperature on the one hand is low enough to make the softened glass of the tube outer wall solidify immediately after contact with the bore inner wall, but which on the other hand is in turn high enough to avoid the development of harmful tensile stresses in the tube wall. Once the glass tube (8) is completely in contact by its outer wall with the inner wall of the mold, the electric resistance heating (4) is switched off. The positive pressure in the tube must be maintained after expansion at least until at least the outer skin of the tube wall of the softened section of length has solidified again. After a short cooling time (as a rule after 1–2 minutes in the case of tubes of a diameter of 40 mm), the calibrated section of tube, while being cooled can be removed from the bore (2) by means of the threaded spindle (11) without any problems, owing to its greater shrinkage in comparison with the mold bore. After cracking off the melted-closed end, the calibrated section of the tube can then, depending on the intended application, either remain on the tube or else likewise be cracked off and fused onto other parts.

The entire disclosures of all applications, patents and publications, if any, cited above, and of corresponding application Federal Republic of Germany P 39 42 566.5-45, filed Dec. 22, 1989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the outer calibration of sections of glass tube having a hollow interior and an outer wall, comprising softening said glass tube over a section of length to be calibrated, expanding resultant softened section of length in a mold having an inner wall comprising a cylindrical cavity of precise dimensions, said mold being open on at least one end, by generating a higher pressure in the interior of the tube than outside the tube, until said outer wall of the tube comes completely into contact with the inner wall of the mold, the improvement which comprises employing a one piece mold consisting essentially of a glass ceramic block having a cylindrical mold bore, said glass ceramic being a dimensionally and thermally stable glass ceramic of a lower thermal expansion than that of the glass being calibrated, and subsequently cooling the mold containing the resultant expanded section of length until the resultant cooled section of length is releasable from the mold due to its grater shrinkage.

2. A process according to claim 1, wherein said expanding is conducted by applying a positive pressure in the glass tube.

3. A process according to claim 1, wherein, during calibration, the mold is maintained at a temperature: (a) sufficiently below the softening temperature of the glass that the softened glass in contact with the mold solidifies immediately and forms a solid outer skin; and (b) a sufficiently high temperature to avoid the formation of harmful tensile stresses in the glass as a consequence of an excessive temperature difference in the tube wall.

4. A process according to claim 3, wherein the mold is maintained at a temperature between 300° C. and 500° C.

5. A process according to claim 1, wherein said glass ceramic has a coefficient of thermal expansion $\alpha_{20°\text{-}500°\ C.}$ less than $3.3 \times 10^{-6} \times K^{-1}$.

6. A process according to claim 4, wherein said glass ceramic has a coefficient of thermal expansion $\alpha_{20°\text{-}500°\ C.}$ less than $3.3 \times 10^{-6} \times K^{-1}$.

7. A process according to claim 1, wherein the coefficient of thermal expansion $\alpha_{20°\text{-}500°\ C.}$ of the glass ceramic is less than zero or approximately equal to zero.

8. A process according to claim 4, wherein the coefficient of thermal expansion $\alpha_{20°\text{-}500°\ C.}$ of the glass ceramic is less than zero or approximately equal to zero.

9. Apparatus for calibrating glass comprising: a mold consisting essentially of a glass ceramic block having a cylindrical mold bore, open at least on one end, said glass ceramic having a coefficient of thermal expansion $\alpha_{20°\text{-}500°\ C.}$ of less than $3.3 \times 10^{-6} \times K^{-1}$, means for heating the mold, means for heating the section of glass tube, means for generating a pressure difference between the interior of the glass tube and its external surroundings, holding means for the glass tube, said holding means being movable up and down in the vertical direction for introducing and removing the section of glass tube into and out of the mold.

10. Apparatus according to claim 9, said means for heating comprising a ring burner (6) attached directly above the opening of the cylindrical mold bore.

11. Apparatus according to claim 9, said means for heating comprising an electric resistance heating (4).

12. Apparatus according to claim 9, said holding means comprising a tube holder (10) vertically displaceable along a longitudinal guide (5), and a threaded spindle (11) adapted to allow upward and downward movement for introducing and extracting the section of length.

13. Apparatus according to claim 10, said holding means comprising a tube holder (10) vertically displaceable along a longitudinal guide (5), and a threaded spindle (11) adapted to allow upward and downward movement for introducing and extracting the section of length.

14. Apparatus according to claim 11, said holding means comprising a tube holder (10) vertically displaceable along a longitudinal guide (5), and a threaded spindle (11) adapted to allow upward and downward movement for introducing and extracting the section of length.

15. Apparatus according to claim 9, wherein the coefficient of thermal expansion $\alpha_{20°\text{-}500°\ C.}$ of the glass ceramic is less than or approximately equal to zero.

16. Apparatus according to claim 10, wherein the coefficient of thermal expansion $\alpha_{20°\text{-}500°\ C.}$ of the glass ceramic is less than or approximately equal to zero.

17. Apparatus according to claim 11, wherein the coefficient of thermal expansion $\alpha_{20°\text{-}500°\ C.}$ of the glass ceramic is less than or approximately equal to zero.

18. Apparatus according to claim 12, wherein the coefficient of thermal expansion $\alpha_{20°\text{-}500°\ C.}$ of the glass ceramic is less than or approximately equal to zero.

19. Apparatus according to claim 13, wherein the coefficient of thermal expansion $\alpha_{20°\text{-}500°\ C.}$ of the glass ceramic is less than or approximately equal to zero.

20. Apparatus according to claim 14, wherein the coefficient of thermal expansion of $\alpha_{20°\text{-}500°\ C.}$ of the glass ceramic is less than or approximately equal to zero.

21. A process according to claim 6, wherein said glass tube is a chemically resistant borosilicate glass having a silica content of about 70–80%, a boric acid content of about 7–13%, an alkali metal oxide content of about 4–8%, an aluminum oxide content of 2–7% and optionally alkaline earth metal oxides with a content of 0–5%.

22. A process according to claim 21, wherein the glass ceramic block consists essentially of the system $Li_2O$—$Al_2O_3$—$SiO_2$ with small quantities of alkali metal oxides, and $TiO_2 + ZrO_2$ as nucleating agents.

23. A method according to claim 22, wherein the glass tube is an industrial glass tubing of a diameter of 40 mm.

24. Apparatus according to claim 9, wherein the glass ceramic block consists essentially of the system $Li_2O$—$Al_2O_3$—$SiO_2$ with small quantities of alkali metal oxides, and $TiO_2 + ZrO_2$ as nucleating agents.

* * * * *